Oct. 9, 1951    J. G. DUSTIN ET AL    2,570,656
BOAT TOWING ASSEMBLY
Filed Jan. 6, 1948
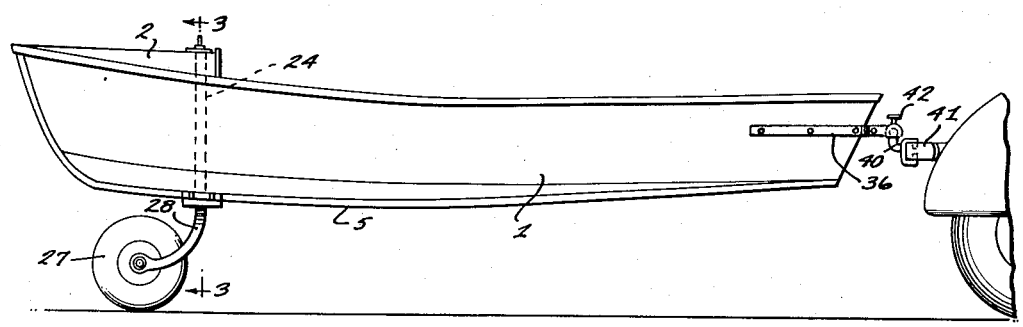
Fig. 1
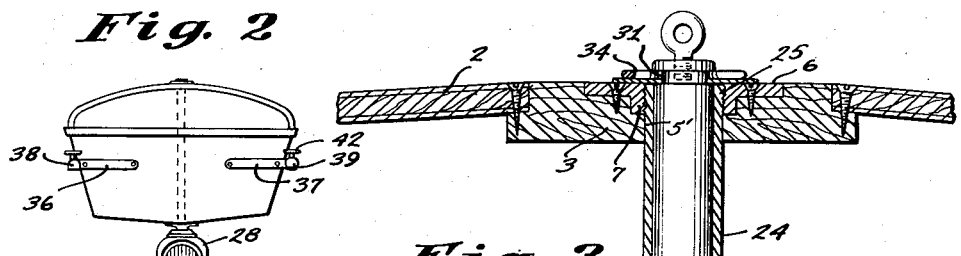
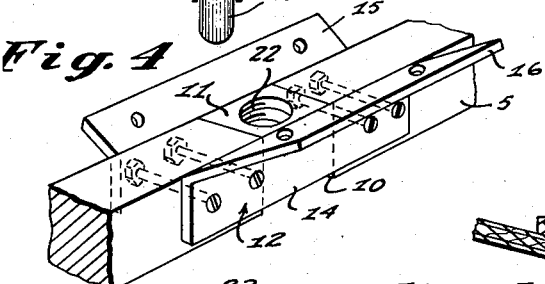
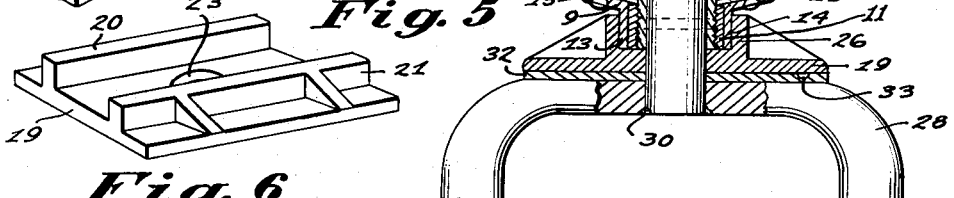
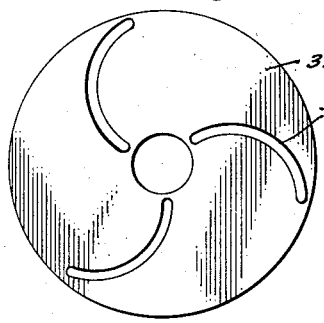
INVENTORS
JACK G. DUSTIN &
LYLE JOHNSON
BY
McMorrow, Berman & Davidson
ATTORNEYS

UNITED STATES PATENT OFFICE 2,570,656

BOAT TOWING ASSEMBLY

Jack G. Dustin and Lyle Johnson, Hadlock, Wash.

Application January 6, 1948, Serial No. 792

2 Claims. (Cl. 9—1)

This invention relates to an assembly adapted to be applied to a boat for towing the latter on land behind an automobile or the like.

An object of the invention is to provide means of this kind involving a forked wheel-mounting and wheel and releasable connections for applying the wheel to the boat bottom in a minimum of time.

Another object is to provide such means that assure proper rotatable relation of the wheel and boat without danger of injury or abrasion to the boat.

Another object is the provision of an assembly of this character that may be applied quickly to existing types of craft with a minimum of modification and at low cost.

These and other objects are attained by the means described herein and illustrated in the accompanying drawing, in which:

Figure 1 is a side elevational view of a boat with the assembly of this invention applied thereto, the boat being shown associated in towing relation with an automobile of which part only is disclosed.

Figure 2 is a rear end view of the assembly-equipped boat as seen in Figure 1.

Figure 3 is an enlarged cross-sectional view on the line 3—3 of Figure 1.

Figure 4 is a detail perspective view of the bracket forming part of the invention and applied to a segregated keel portion of a boat.

Figure 5 is a detail perspective view of the saddle plate of the present assembly.

Figure 6 is a plan view of a pressure washer utilized with the present assembly.

Figure 7 is a top plan view of the upper end of the mounting shaft and adjacent parts of the assembly.

With detailed reference to the drawings, this assembly is contemplated for use with craft of the smaller type comprising generally a hull 1, deck 2, beam 3, inner keel 4 and outer keel 5. The beam 3, adjacent the inner extremity, is provided with an opening 5' to the upper end of which a plate 6, formed with an interiorly-threaded socket 7, is secured.

The inner keel 4 and hull 1, adjacent thereto, are provided with registering openings, 8 and 9, respectively, and immediately therebeneath the outer keel 5 is formed with a square recess 10, Figure 4. This recess is adapted for the snug reception of a metal block 11 forming the center element of a bracket 12 formed at the sides with lower flanges 13 and 14, and upper, laterally and angularly disposed flanges 15 and 16. The latter are provided with apertures to receive threaded bolts 17 which pass upwardly through hull 1 and inner keel 4 and are suitably secured thereto as by nuts 18. Block 11 has a threaded opening or socket 22 that registers with the openings 8 and 9 of keel 4 and hull 1.

A saddle plate 19 comprises a pair of upstanding parallel flanges 20 and 21 between which an aperture 23 is formed in the plate. Plate flanges 20 and 21 are adapted to receive between them the lower flanges 13 and 14 of bracket 12, with opening 23 registering with apertures 8, 9 and 22.

A tube 24 is vertically positioned in the boat, having an upper exteriorly-threaded end 25 associated with socket 7 and a similarly threaded open lower end 26 received in the threaded opening 22 of the block 11.

A tire-equipped wheel 27 is provided with a forked resilient mounting 28 from the top of which projects a shaft 29 having a lower end welded as at 30, Figure 3, to said mounting and its upper end formed with an annular groove 31. The shaft is insertable rotatably through the aperture 23 of saddle plate 19 into tube 24 for associating the wheel with the boat. Between the top of mounting 28 and bottom of plate 19 a pressure washer 32, formed with grease channels 33, is positioned, Figures 3 and 6. At the upper end of shaft 29, which projects above the deck beam 3, a lock clip 34 is resiliently positioned in annular groove 31. An eye bolt 35 may be threadedly mounted in the top extremity of shaft 29.

The wheel unit is thus quickly and easily associated with the boat and as readily removed therefrom. For towing the boat on said wheel, the opposite end of the hull may have metal straps 36 and 37 secured thereto, which at their ends, are provided with socket members 38, 39 adapted to receive suitable pintles 40 secured to the rear bumper 41 of an automobile and releasably fastened within said socket members by suitable tightening elements 42.

Modifications will suggest themselves upon consideration of the means herein disclosed, but these are believed to be included within the spirit and scope of the present invention.

What is claimed is:

1. The combination with a boat having a hull, inner and outer keels and a deck, of means for towing the boat on land behind an automobile or the like and comprising a block having a screw threaded opening and provided at opposite sides with extensions which project longitudinally of the hull and outer keel and beyond the ends of the block, the outer keel having a recess receiving the block, said extensions of the block comprising upper flanges secured to the hull and lower spaced flanges secured to the sides of the outer keel, a substantially vertical tube positioned within the boat and having its upper end secured to the deck, the lower end of the tube being open and screw threaded and engaging within the screw threaded opening of the block, a separate saddle plate arranged below said outer keel and including a pair of spaced upstanding flanges receiving the lower flanges of the block extensions between them so that the block and adjacent portions of the outer keel engage upon the saddle plate, the saddle plate having an opening between its upstanding flanges in registration with the open lower end of the tube, a caster disposed below the saddle plate and including an upstanding substantially vertical shaft slidably engaging within the opening of the saddle plate and tube, means for releasably securing the shaft within the tube, and means at one end of the hull for attaching the boat to an automobile in a raised position above the ground.

2. In towing apparatus for a boat having a depending keel extending longitudinally thereof and provided with a recess forming keel sections, a block mounted within the recess of the keel and having a substantially vertical screw threaded opening, flanges connected with opposite sides of the block and extending longitudinally forwardly and rearwardly of the block and each disposed adjacent to each opposite side of the block and engaging said keel sections and secured to the keel sections, a substantially vertical tube positioned within the boat above the keel and having its lower end screw threaded and engaging within the screw threaded opening of the block, the lower end of the tube being open, the bottom faces of said keel sections and block being substantially flush, a separate substantially flat saddle plate positioned beneath the block and extending longitudinally forwardly and rearwardly thereof and contacting the bottom faces of the block and keel sections, the saddle plate having a substantially central opening in registration with the lower open end of the tube, a pair of spaced upstanding flanges secured to the top of the saddle plate and arranged adjacent to the outer faces of the plates connected with the block, the saddle plate being free from positive connection with the keel, block and tube, a caster disposed beneath the saddle plate and engaging the same and including an upstanding substantially vertical shaft extending slidably through the opening of the saddle plate and into the tube, and means connected with the shaft for releasably securing it within the tube.

JACK G. DUSTIN.
LYLE JOHNSON.

REFERENCES CITED

The following references are of record in the file of this patent:

UNITED STATES PATENTS

| Number | Name | Date |
|---|---|---|
| 1,755,537 | Deisler | Apr. 22, 1930 |
| 2,157,186 | Pinter et al. | May 9, 1939 |
| 2,198,270 | Maranville | Apr. 23, 1940 |